(12) United States Patent
Kim et al.

(10) Patent No.: US 10,789,317 B2
(45) Date of Patent: Sep. 29, 2020

(54) APPARATUS AND USER DEVICE FOR PROVIDING FEEDBACK EFFECT ABOUT POSTS ON SOCIAL NETWORK SERVICES

(71) Applicant: KAKAO CORP., Jeju-si, Jeju-do (KR)

(72) Inventors: Youn Woo Kim, Yongin-si (KR); Ji Soo Youk, Seoul (KR); Jeong Hyeon Lee, Seoul (KR); Ji Hyun Bang, Seongnam-si (KR); Ji Hye Kim, Seoul (KR)

(73) Assignee: KAKAO CORP., Jeju-si, Jeju-Do (KR)

( * ) Notice: Subject to any disclaimer, the term of this patent is extended or adjusted under 35 U.S.C. 154(b) by 0 days.

(21) Appl. No.: 16/053,864

(22) Filed: Aug. 3, 2018

(65) Prior Publication Data
US 2019/0042655 A1   Feb. 7, 2019

(30) Foreign Application Priority Data

Aug. 3, 2017   (KR) .......................... 10-2017-0098485

(51) Int. Cl.
*G06F 16/9535*   (2019.01)
*G06F 16/31*   (2019.01)
(Continued)

(52) U.S. Cl.
CPC .......... *G06F 16/9535* (2019.01); *G06F 9/451* (2018.02); *G06F 16/313* (2019.01);
(Continued)

(58) Field of Classification Search
CPC ......... G06F 17/30867; G06F 17/30616; G06F 16/9535; G06F 16/313; G06F 9/451;
(Continued)

(56) References Cited

U.S. PATENT DOCUMENTS 9,148,353 B1 *   9/2015   Pasqua ................. H04L 43/065
10,231,024 B2 *   3/2019   Pinto ................ H04N 21/23614
(Continued)

FOREIGN PATENT DOCUMENTS

KR   1020090000268 A   1/2009
KR   1020100064848 A   6/2010
(Continued)

OTHER PUBLICATIONS

Yin, "All the Keywords That Activate Facebook's Text Delight Animations", 22 pages, Jul. 30, 2017. (Year: 2017).*

*Primary Examiner* — Arvin Eskandarnia
*Assistant Examiner* — Chhian (Amy) Ling
(74) *Attorney, Agent, or Firm* — Hamre, Schumann, Mueller & Larson, P.C.

(57) ABSTRACT

An apparatus that provides a feedback effect regarding on a social network service includes a post generation unit configured to receive a post that has a tag associated with a feedback effect from a user device and post the post on the social network service, a feedback collection unit configured to collect feedback in response to the post from another user device that accesses the post, and an effect providing unit configured to apply a predetermined feedback effect corresponding to the tag included in the post according to predetermined condition, wherein the predetermined feedback effect is selected from among multiple feedback effects preset for one or more of tags, and the predetermined condition includes at least one of a type of the feedback and a quantity of the feedback.

16 Claims, 11 Drawing Sheets

(51) Int. Cl.
*H04L 12/58* (2006.01)
*G06F 9/451* (2018.01)
*G06Q 50/00* (2012.01)

(52) U.S. Cl.
CPC .............. *H04L 51/16* (2013.01); *H04L 51/32* (2013.01); *G06Q 50/01* (2013.01)

(58) Field of Classification Search
CPC ........ G06Q 50/01; G06Q 50/30; H04L 51/32; H04L 51/16
See application file for complete search history.

(56) References Cited

U.S. PATENT DOCUMENTS

| | | | | |
|---|---|---|---|---|
| 2011/0216160 | A1* | 9/2011 | Martin | H04N 5/89 348/40 |
| 2012/0265806 | A1* | 10/2012 | Blanchflower | G06Q 10/10 709/204 |
| 2013/0069976 | A1* | 3/2013 | Lee | G06F 3/016 345/619 |
| 2017/0323335 | A1* | 11/2017 | Choi | G06F 3/048 |
| 2018/0167692 | A1* | 6/2018 | Kedenburg, III | H04N 21/466 |
| 2018/0191797 | A1* | 7/2018 | Javier | H04L 67/2804 |
| 2018/0254068 | A1* | 9/2018 | Kulkarni | H04N 21/458 |

FOREIGN PATENT DOCUMENTS

| | | | |
|---|---|---|---|
| KR | 1020130029579 | A | 3/2013 |
| KR | 1020130069870 | A | 6/2013 |
| KR | 1020160090715 | A | 8/2016 |
| KR | 1020170050325 | A | 5/2017 |

\* cited by examiner

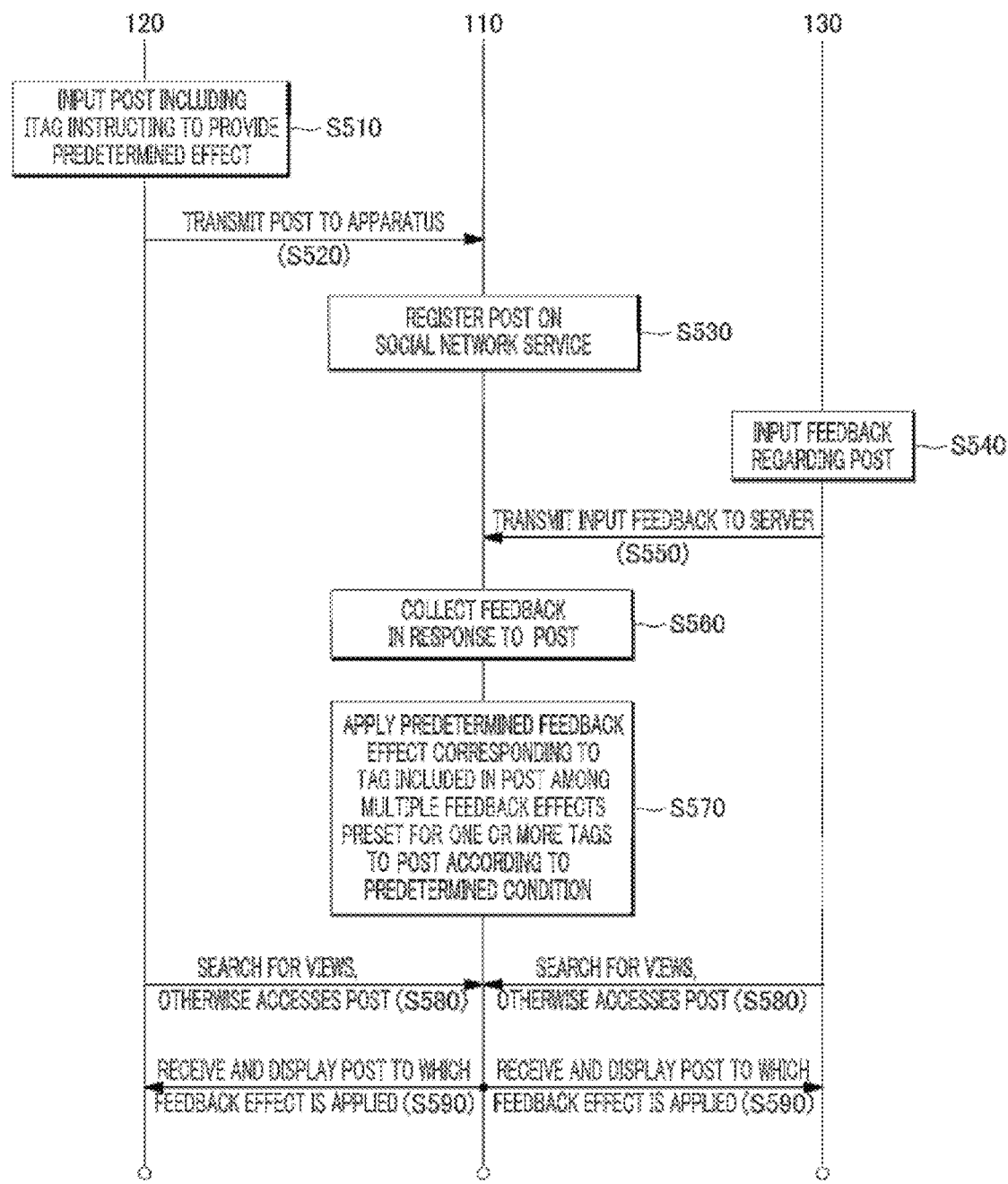

APPARATUS AND USER DEVICE FOR PROVIDING FEEDBACK EFFECT ABOUT POSTS ON SOCIAL NETWORK SERVICES

CROSS-REFERENCE TO RELATED APPLICATION

This application claims the benefit under 35 USC 119(a) of Korean Patent Application No. 10-2017-0098485 filed on 3 Aug. 2017, in the Korean Intellectual Property Office, the entire disclosure of which is incorporated herein by reference for all purposes.

TECHNICAL FIELD

The present disclosure relates to providing a graphic effect pertaining to feedback regarding one or more posts on a social network service.

BACKGROUND

Generally, social network services (SNS) function to connect users, and maintain and manage those relationships by, e.g., enabling users to exchange messages. The communication between users may be public, semi-public, or private. The communications may include the transmission of image- or text-based information messages.

A recently commercialized posting service enables acquaintances to instantly share information through posts in a mobile and online environment using a chat application or messenger service that function as a communication platform of the SNS.

In this regard, Korean Patent Laid-open Publication No. 2013-0069870 discloses a configuration in which if a user looks up specific advertising content, the advertising content is modified based on the user's information, such as the user's SNS profile, and then the modified advertising content is provided to the user.

SUMMARY

In view of the foregoing, the present disclosure pertains to providing different feedback effects regarding respective posts on one or more social network services according to feedback received on respective posts. Also, disclosed and recited herein are an apparatus and user device configured to facilitate the collection of feedback regarding a SNS post from multiple user devices on which the post has been viewed, and implement a feedback effect in reaction to the post, as well as a method thereof. Further, the present disclosure provides an apparatus and user device configured to apply different feedback effects that may be preset to correspond to predetermined condition and that may be determined by tags to respective posts, thus providing visual effects to a user, as well as a method thereof.

However, problems to be solved by the present disclosure are not limited to the above-described problems.

According to an exemplary embodiment of the present disclosure, an apparatus that provides a feedback effect regarding a SNS post may include a post generation unit configured to receive a post that has a tag associated with a feedback effect from a user device; posts the post on the SNS; a feedback collection unit configured to collect feedback in response to the post from another user device that accesses the post; and an effect providing unit configured to apply a predetermined feedback effect corresponding to the tag according to predetermined condition. The predetermined feedback effect is selected from among multiple feedback effects respectively pre-assigned to one or more of multiple tags. The predetermined condition may include at least one of a type of the feedback and a quantity of the feedback.

According to another exemplary embodiment of the present disclosure, a method of providing a feedback effect regarding a SNS post by a feedback effect providing apparatus may include receiving a post that has a tag associated with a feedback effect from a user device, and posting the post on the SNS; collecting feedback in response the post from another user device that accesses the post; and applying a predetermined feedback effect corresponding to the tag according to predetermined condition. The predetermined feedback effect is selected from among multiple feedback effects preset for one or more of tags. The predetermined condition may include a type of the feedback and a quantity of the feedback.

According to another exemplary embodiment of the present disclosure, a method of providing a feedback effect regarding a SNS post by a user device may include receiving a post that has a tag associated with a feedback effect; transmitting the post to a feedback effect providing apparatus; displaying the post on the SNS; and providing a predetermined feedback effect corresponding to the tag according to predetermined condition if the feedback effect providing apparatus collects feedback in response to the post from another user device that accesses the post. The predetermined feedback effect is selected from among multiple feedback effects preset for one or more of tags. The predetermined condition may include a type of the feedback received and a quantity of the feedback.

According to any of the embodiments described herein, an apparatus and user device provide different feedback effects in response to posts on a SNS according to registered feedback; and corresponding methods thereof are disclosed and recited, as well.

Further, according to any of the embodiments described herein, an apparatus and user device collect feedback in response to a post from multiple user devices on which the post is viewed, and thus provide feedback effect in response the post; and methods thereof are disclosed and recited, as well.

Furthermore, according to any of the embodiments described herein, an apparatus and user device apply different feedback effects preset corresponding to predetermined condition, and are determined by tags to respective posts, thus applying visual effects to a user; and methods thereof are disclosed and recited, as well.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

FIG. 5 shows a processing flow for providing a feedback effect service by a feedback effect providing system, in accordance with various embodiments described herein.

DETAILED DESCRIPTION

Figure 1:
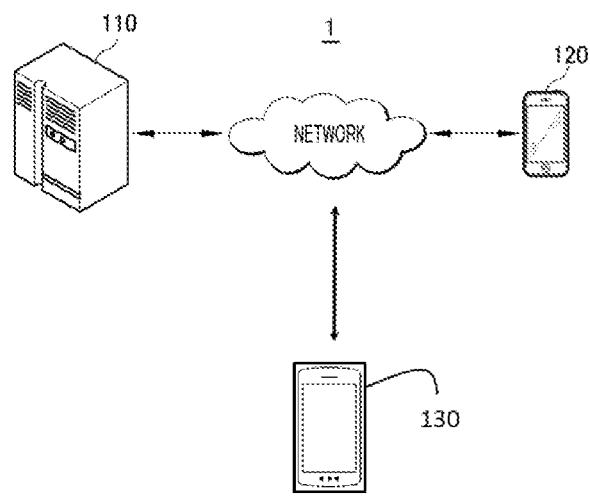
FIG. 1 shows a feedback effect providing system, in accordance with various embodiments described herein.

Hereafter, embodiments of the present disclosure will be described in detail with reference to the accompanying drawings so that the present disclosure may be readily implemented by those skilled in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Throughout this document, the term "connected to" that is used to designate a connection or coupling of one element to another element includes both an element being "directly connected" another element and an element being "electronically connected" another element via still another element. Further, it is to be understood that the term "comprises or includes" and/or "comprising or including" used in the document means that one or more other components, steps, operation and/or existence or addition of elements are not excluded in addition to the described components, steps, operation and/or elements unless context dictates otherwise and is not intended to preclude the possibility that one or more other features, numbers, steps, operations, components, parts, or combinations thereof may exist or may be added.

Throughout this document, the term "unit" includes a unit implemented by hardware and/or a unit implemented by software. As examples only, one unit may be implemented by two or more pieces of hardware or two or more units may be implemented by one piece of hardware. However, the "unit" is not limited to the software or the hardware and may be stored in an addressable storage medium or may be configured to implement one or more processors. Accordingly, the "unit" may include, for example, software, object-oriented software, classes, tasks, processes, functions, attributes, procedures, sub-routines, segments of program codes, drivers, firmware, micro codes, circuits, data, database, data structures, tables, arrays, variables and the like. The components and functions provided by the "units" can be combined with each other or can be divided up into additional components. Further, the components and the "units" may be configured to implement one or more CPUs in a device or a secure multimedia card.

FIG. 1 shows an example feedback effect providing system, in accordance with various embodiments described herein. A feedback effect providing system 1 may include, at least, a server 110 and a user device 120. The server 110 and the user device 120 are illustrated as example components that may be controlled at least in part by the feedback effect providing system 1. Meanwhile, the server 110 may also be referred to as a feedback effect providing apparatus.

The components of the feedback effect providing system 1 may typically be connected to each other via a network. For example, as illustrated in FIG. 1, the server 110 may be connected to the user device 120.

The network refers to a connection structure that facilitates information exchange between nodes such as devices and servers. Examples of the network may include 3G, 4G, 5G, Wi-Fi, Bluetooth, Internet, LAN (Local Area Network), Wireless LAN (Wireless Local Area Network), WAN (Wide Area Network), PAN (Personal Area Network), and the like, but are not limited thereto.

The server 110 refers to a server that may be connected to, and provide, a social network service to the user device 120. The server 110 may provide the user device 120 with a feedback effect service in response to one or more posts on the social network service. The feedback effect service may facilitate one or more modifications to the shape and/or form of a post on a SNS, based on feedback from another user who is not the one who posted on the SNS. The feedback effect service may be implemented on a post that is written with a tag associated therewith, with the tag corresponding to a predetermined effect. For example, the tag may refer to or identify a hashtag (e.g., # feelingpiling, # flyingcomment, # getbigger, etc.), which may include a specific phrase in compliance with service policies.

The server 110 may receive a SNS post that includes a tag corresponding to a predetermined effect from the user device 120. As a non-limiting example, the tag corresponding to a predetermined effect may be a hashtag, and the post may include text, an image, or video input by a user of the user device 120. The server 110 may post the input text, image, or video from the user device 120 on the social network service.

The server 110 may collect feedback in response to the post from one or more user devices on which the post on the social network service has been viewed or otherwise accessed. For example, the feedback may include a comment in response to the post and/or emotive information input by a user who looks up the post. The emotion information refers to information indicative of an emotion input by the user who views or otherwise accesses the post, including statements or graphics such as, but not limited to, "like", "dislike", "great", "sad", etc.

The server 110 may apply a predetermined feedback effect corresponding to the tag included in or associated with the post from among multiple feedback effects preset for one or more tags that may be associated with a post, according to predetermined condition. For example, the predetermined condition may include a type of feedback and/or a quantity of feedback. The type of feedback may include at comments, text corresponding to a predetermined feedback effect and included in a comment, and/or emotive information. The feedback effect may refer to effect information that may be added to or may modify an appearance of the post without affecting contents and attributes of the post. For example, the feedback effect may be a specific image overlapping on the post or color information to modify the background of the post. In other words, as disclosed and recited herein, a feedback effect may be a graphic that conveys the theme of feedback to a SNS post, received from one or more viewers or accessors of the post, and that is superimposed on the post, overlaps the post, is displayed in the background of the post, hovers over the post, and/or is displayed in some other manner relative to the post. Further examples of the display of a feedback effect may include, as non-limiting examples, modify a font or color of at least a portion of the post itself; apply a graphic effect to at least a portion of the post, e.g., make at least portions of the post transparent or of varying density.

The user device 120 may be connected to the server 110 to access a SNS, and may input a post to the SNS. The user device 120 may also be utilized to input feedback regarding a previous post. Viewing or otherwise accessing a post or receiving feedback may be performed by one or more user devices.

The user device 120 may receive, from the user, text, one or more images, one or more videos, etc., as input for a SNS post, as well as an associated tag corresponding to a predetermined effect. The user device 120 may transmit the input for the post to the SNS, as facilitated by server 110.

The user device 120 may display the post on the SNS according to a search or a request of user.

The user device 120 may receive feedback in response to an SNS post. The user device 120 may transmit the received feedback to the server 110, and the transmitted feedback may be attached to or otherwise associated with the SNS post. In this case, a posting service that enables input of feedback in response to a SNS post may be provided through the SNS provided by the server 110.

If the server 110 collects feedback in response to a post from another user device on which the post has been viewed or otherwise accessed, the user device 120 may provide a predetermined feedback effect corresponding to a tag included in or otherwise associated with the post selected from among multiple feedback effects preset for one or more tags, stored on the server 110, through the displayed post according to predetermined condition.

Therefore, according to the present disclosure, a user device that provides feedback in response to a post does not have to be the user device from which the SNS post originates. According to the present disclosure, the user device 120 may represent multiple user devices, and the server 110 may receive posts or feedback from any one or more of the multiple user devices.

A feedback effect according to an embodiment of the present disclosure will be described in detail with reference to FIGS. 6A to 6D and FIGS. 7A to 7C.

FIGS. 6A to 6D show aspects of a feedback effect service provided through a user device 120, in accordance with various embodiments disclosed and recited herein. Referring to FIGS. 6A to 6D, a post UI 601 of the user device on which a SNS post may be displayed may include a content area 602, a feedback area 603, an input window 604, and a tag 605.

A SNS post may include text, an image, or a video uploaded by the user. The post may be displayed on the post UI 601, particularly on the content area 602. The post UI 601 may be divided into the content area 602 corresponding to a post and the feedback area 603, the input window 604 and the tag 605 corresponding to a UI area.

The feedback area 603 may be configured to display feedback input by a user of another user device on which the SNS post is viewed or otherwise accessed.

The input window 604 may be configured to receive the feedback input by the user of another device, prior to display. That is, feedback received by the input window 604 may be displayed in the feedback area 603.

The tag 605 may be a hashtag such as, e.g., "# CONGRATULATEME". Further to the example, the tag may be associated with a corresponding feedback effect such as, but not limited to, the output of a "congratulation object image" that corresponds to an input text "congratulate."

Figure 6A:
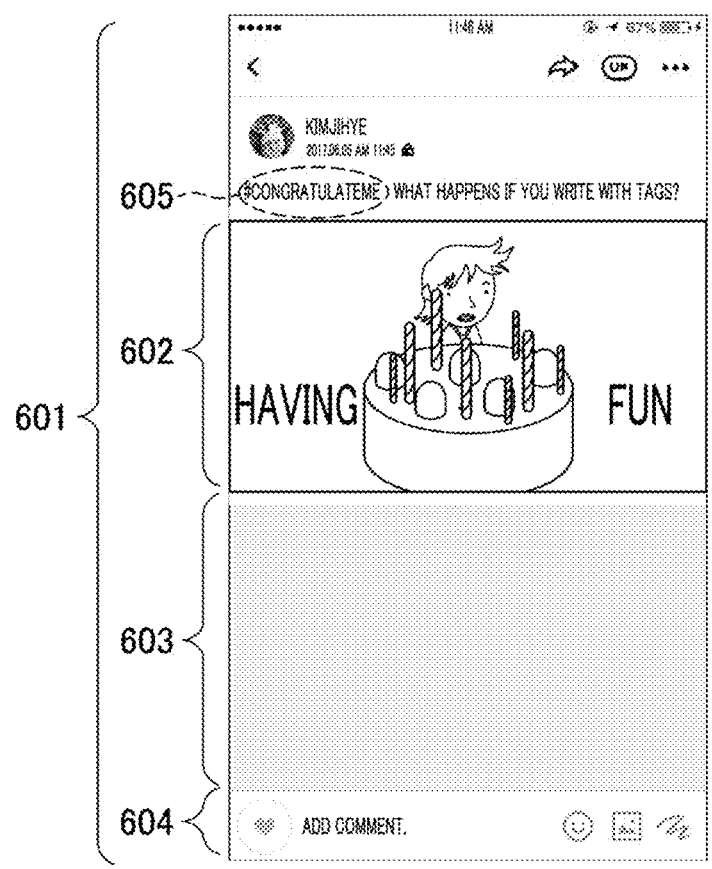
FIGS. 6A, 6B, 6C and 6D show aspects of a feedback effect service provided through a user device, in accordance with various embodiments described herein.
Figure 6B:
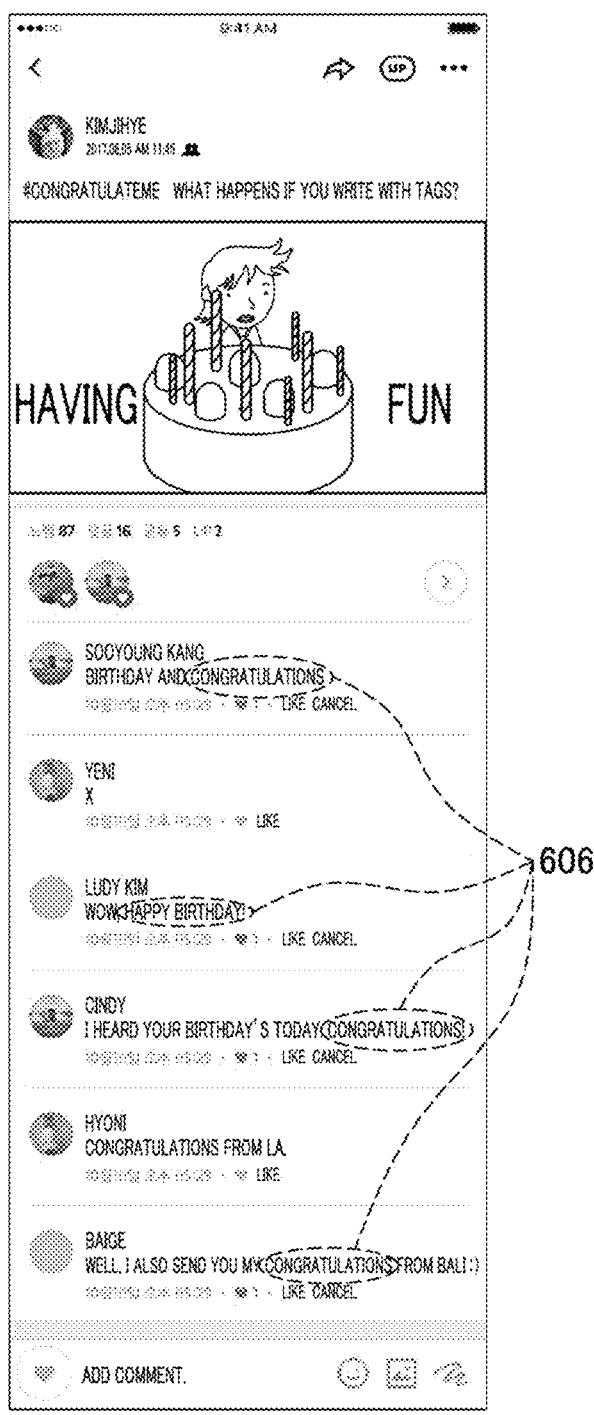
Figure 6C:
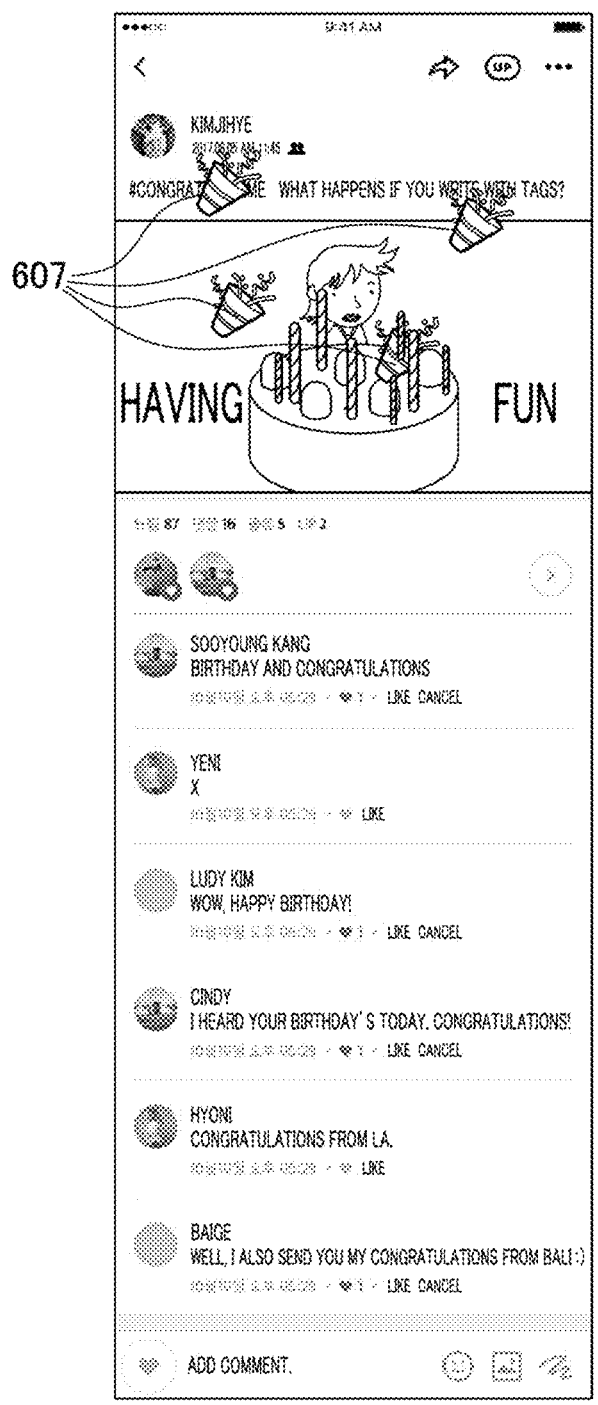
Figure 6D:
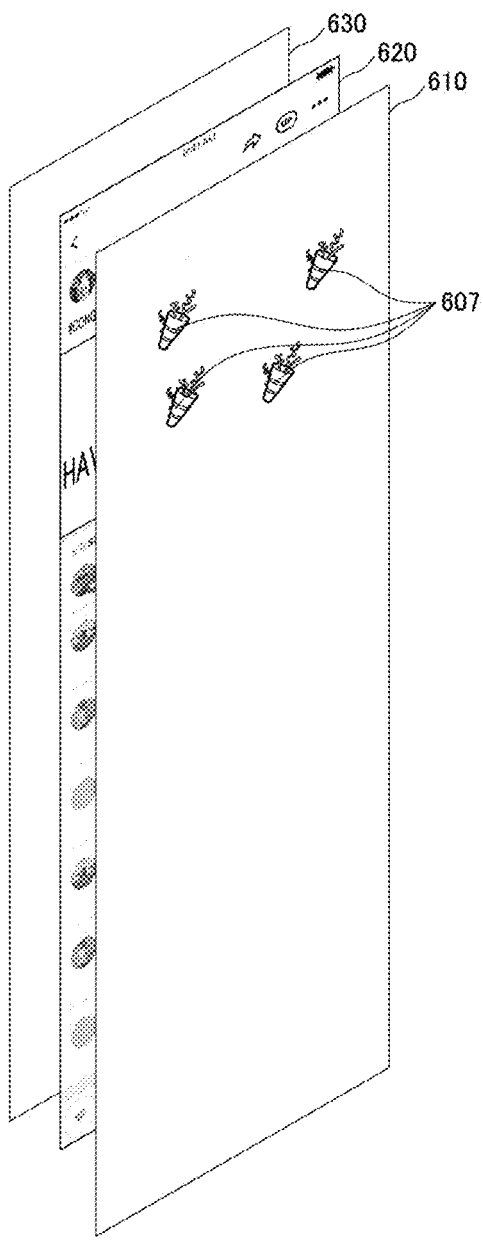

If feedback 606 shown in FIG. 6B, corresponding to the "# CONGRATULATEME" tag 605, is input into the feedback area 603, the server 110 may collect the received comments in response to the post and substitute the text "congratulations" with the "congratulation object image," and thus apply a feedback effect 607, shown in FIGS. 6C and 6D, that has been preset to correspond to a predetermined condition, e.g., the "# CONGRATULATEME" tag 605, to the post UI 601. In the non-limiting example of FIG. 6C, the "congratulation object image" may be the display of graphic representations of party favors that may be displayed as passing over the post UI 601, superimposed on the post UI 601, overlap the post UI 601, be displayed in the background of the post UI 601, hover over the post UI 601, etc.

Figure 7A:
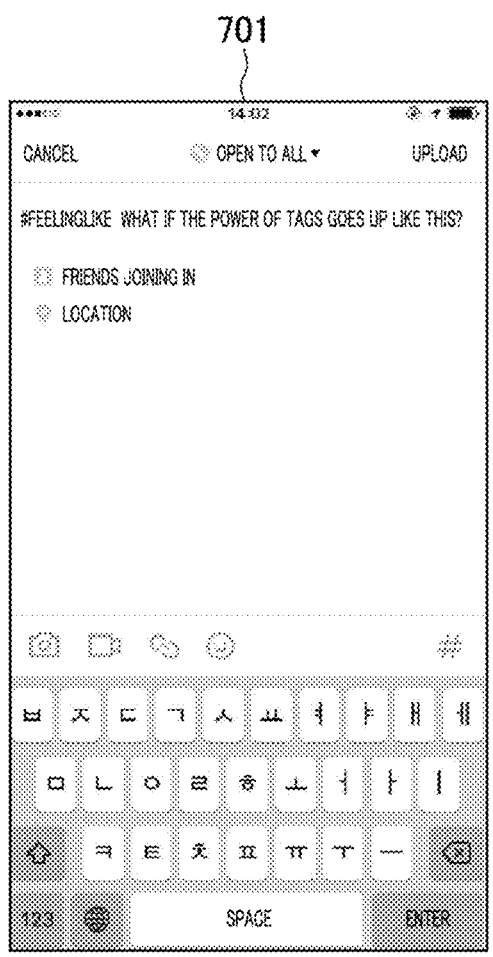
FIGS. 7A, 7B and 7C show aspects of a feedback effect service provided through a user device, in accordance with various embodiments described herein.
Figure 7B:
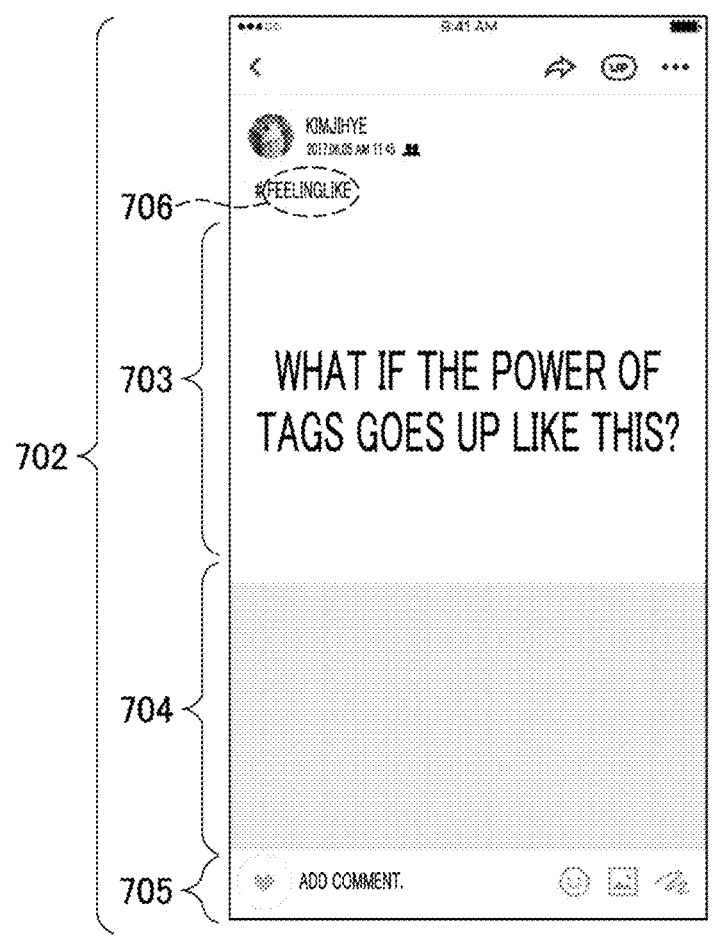
Figure 7C:
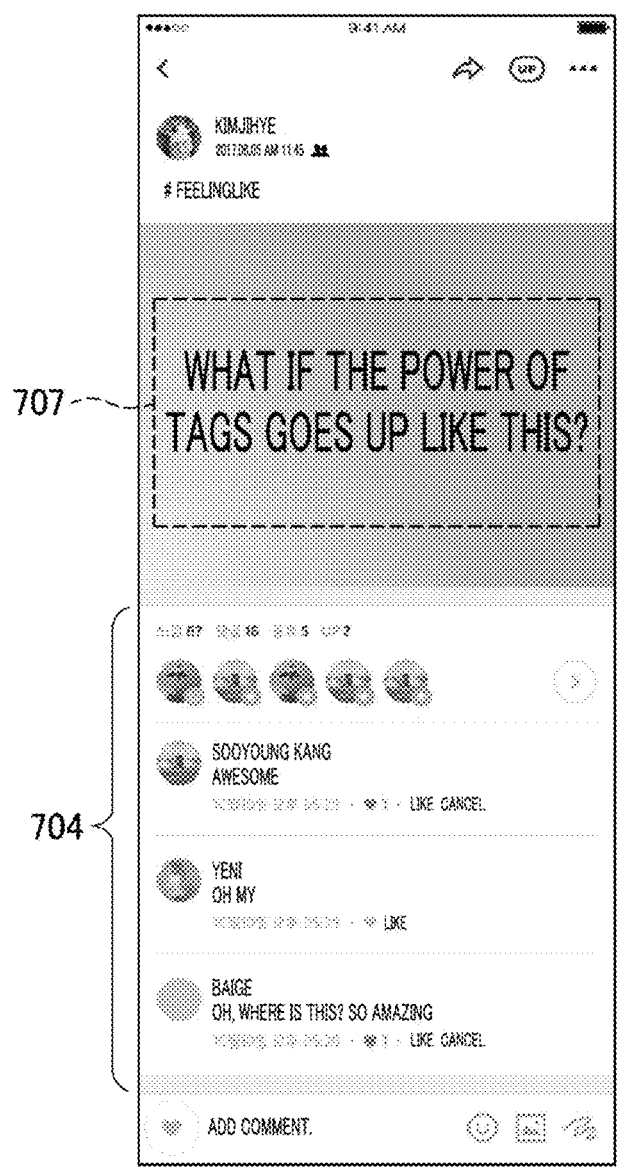

FIGS. 7A to 7C are example diagrams illustrating a feedback effect service provided through a user device in accordance with another embodiment of the present disclosure.

Referring to FIGS. 7A to 7C, the user device 120 may display a post input screen 701 configured to receive an input text, image, video, tags, location, names of SNS contacts, etc., from a user for a SNS post.

A post UI 702, as shown in FIG. 7B, may be generated via the post input screen 701 and may be configured to display a post on the user device 120. The post UI 702 may include a content area 703, a feedback area 704, an input window 705, and a tag 706.

The input for the SNS post may include least one of text, an image, and/or a video uploaded by the user. The post may be displayed on the post UI 702, particularly on the content area 703. The post UI 702 may be divided into the content area 703 corresponding to a post and the feedback area 704, the input window 705 and the tag 706 corresponding to a UI area.

The feedback area 704 may be configured to display feedback input by a user of another user device on which the SNS post is viewed or otherwise accessed.

The input window 705 may be configured to receive feedback input by the user of another device, prior to display. That is, the feedback received by the input window 705 may be displayed in the feedback area 704.

The tag 706 may be a hashtag such as "# FEELINGLIKE". Further to the example, the tag may be associated with a corresponding feedback effect such as, but not limited to, the output of an effect that corresponds to an input that expresses an emotive response to the post.

If an emotive response related to the "# FEELINGLIKE" tag 706 is input into the feedback area 704, the server 110 may collect input emotive responses to the post, and apply a feedback effect to change a color of a background area 707 of the post to the post based on a majority of the collected emotive responses. For example, the appearance of a number may be modified, the contrast and saturation of colors in the background area may be modified, etc. That is, further to the example, if a majority of the received emotive responses include "sad" and/or "like," a dark color to represent "sad" and a bright color to represent "like" may be displayed simultaneously as background colors, while the contrast and saturation of the dark color and the bright color may vary depending on the ratio of the corresponding received responses.

Figure 2:
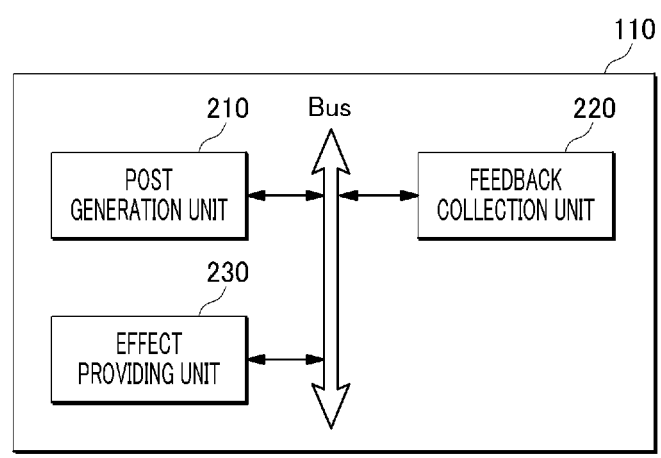
FIG. 2 shows a server, in accordance with various embodiments described herein.

Hereafter, the components of a server configured to implement an embodiment of the present disclosure and the functions of the components will be described in detail with reference to a configuration diagram of a server according to an embodiment of the present disclosure as illustrated in FIG. 2.

As illustrated in FIG. 2, the example server 110 may include a post generation unit 210, a feedback collection unit 220, and an effect providing unit 230.

The post generation unit 210 may be configured to receive, from user device 120, a post including a tag that corresponds to a predetermined effect. As an example, the tag corresponding to a predetermined effect may refer to a hashtag, and the post may include text, one or more images, and/or video input by the user of the user device 120. The post generation unit 210 may post the input on the SNS.

The feedback collection unit 220 may collect feedback in response the post from one or more other user devices on which the SNS post has been viewed or otherwise accessed. For example, the feedback may include a comment in response to the post and/or emotive information input by a user who has viewed or otherwise accessed the post. Further to the example, the emotive information may reflect an emotive response of the user who views or otherwise accesses the post. The emotive information may include, e.g., input such as "like", "dislike", etc.

The effect providing unit 230 may store and maintain information regarding multiple feedback effects that have each been preset to correspond to one or more tags. The effect providing unit 230 may apply a predetermined feedback effect corresponding to a tag included in or otherwise associated with a SNS post from among the multiple feedback effects according to predetermined condition. For example, the predetermined condition may include a type of feedback, a quantity of feedback, etc. The type of feedback may include one or more comments; text, within a comment, that corresponds to a predetermined feedback effect; and/or emotive information.

As an example, the effect providing unit 230 may provide a predetermined feedback effect depending on a quantity of comments received in response to a SNS post. Thus, for example, the quantity of specific object images displayed to overlap the post may be proportional to the quantity of comments received in response to the post; or as the quantity of comments increases, a background color of the post may change.

As another example, if the tag included in or otherwise associated with the post is "# feelingpiling", the effect providing unit 230 may apply a preset feedback effect that corresponds to a predetermined condition and is further determined by the quantity of emotive information feedback in response to the post.

In another example, the effect providing unit 230 may provide a feedback effect that overlap with each other. That is, a feedback effect expressed based on the quantity of comments and a feedback effect based on a quantity of emotive responses may be displayed as overlapping with each other.

In yet another example, if the tag included in or otherwise associated with the post is "# flyingcomment", the effect providing unit 230 may apply a feedback effect to integrate comments in response to the post to be displayed as if hovering or flying within the post.

In another example, if the tag included in or otherwise associated with the post is, e.g., "# HeHeHeHe", "# HaHaHaHa", and/or "HeHeHaHa", the effect providing unit 230 may apply a feedback effect to integrate the text "He" or "Ha" in a corresponding comment, displayed as if hovering or flying within the post.

In yet another example, if the tag included in or otherwise associated with the post is "# getbigger", when a comment or emotive information is input in response to the post, the effect providing unit 230 may apply a feedback effect to enlarge the text included in the post.

The effect providing unit 230 may provide feedback effects depending on the quantity of feedback received in response to a SNS post, types of text included in a respective comment received in response to a post, and/or the quantity and/or types of emotive information received in response to the post. For example, the effect providing unit 230 may enlarge an area in which a feedback effect may be displayed or provide a more conspicuous feedback effect as the quantity of text in response to the post increases; and the effect providing unit 230 may provide a feedback effect that includes displaying different colors depending on whether received text responses are positive or negative. This can be equally applied to when a feedback effect is provided depending on emotive information.

If the quantity of text included in a responsive comment, which corresponds to a predetermined feedback effect, exceeds a threshold value, the effect providing unit 230 may provide a secondary effect, as well. For example, the effect providing unit 230 may enlarge an area in which a feedback effect may be displayed or provide a more conspicuous feedback effect as the quantity of text in response to the post increases; and if the quantity of text included in a comment, which corresponds to a predetermined feedback effect which exceeds a threshold value, the effect providing unit 230 may provide a secondary effect that includes displaying a pop-up of an image corresponding to the feedback effect.

If a setting value about a feedback effect is set to "ON," the effect providing unit 230 may provide the feedback effect; but if set to "OFF", the effect providing unit 230 would not provide the feedback effect.

If a post UI configured to display a post includes a content area configured to display text, an image, and/or a video uploaded by the user device 120 and a feedback area into which feedback in response to posted content may be input from another user device or the user device 120, the effect providing unit 230 may provide a feedback effect to cover the entire area including the content area and the feedback area.

A feed UI may refer to a UI configured to display multiple posts provided from multiple user devices on a screen (i.e., a user interface configured to enable a search of feeds of multiple users on a screen by scrolling). For example, if the feed UI is provided, each content area for the multiple posts is provided; and, thus, a feedback effect may be provided within each content area. Further, if a post to which a feedback effect is applied is selected from the feed UI by any user device, the entire area including the content area and the feedback area may be shown on a screen of the user device.

If a post includes two or more tags, the effect providing unit 230 may independently apply different feedback effects set for the respective tags to the post. Further, if the tags are modified, the effect providing unit 230 may modify the feedback effects applied to the post; and if a tag is added, the effect providing unit 230 may add an appropriate feedback effect to the post. If a tag is removed, the effect providing unit 230 may remove a feedback effect applied to the post; and if a tag is repeated, the effect providing unit 230 may generate a feedback effect for the foremost tag.

Referring to FIG. 6D, if a SNS post is displayed in adjacent or overlapping tabs or layers including a front layer 610, a back layer 630, and a post layer 620, the effect providing unit 230 may apply the feedback effect to the front layer 610 or the back layer 630 depending on the type of tag.

For example, the effect providing unit 230 may apply a feedback effect 607 applicable to the front layer 610 to overlap the post or a feedback effect applicable to the back layer 630 to modify attributes of the background of the post.

If the feedback effect changes a background color of the post, the effect providing unit 230 may change a color of the back layer 630. For example, referring to FIGS. 7A to 7C, if the SNS post simply includes text, a background color of the post may be set to white and the text may be displayed on the white background. Then, the background color of the post may change to another color based on a comment and/or emotive information provided by another user (for example, as the quantity of emotion information increases) in response to the post. That is, a post including text only may include only attributes of text as attribute information and a background color visible to the user's eyes may be changed depending on attributes of the back layer. Therefore, by changing a color of the back layer, it is possible to show a change without changing attributes of the post registered by the user.

If a comment in response to the post includes text corresponding to a predetermined feedback effect, the effect providing unit 230 may display a predetermined object image that is to overlap at least a portion of the post. In this case, the object image may be displayed in an area of the front layer 610.

In an additional embodiment, the effect providing unit 230 may give a weight depending on whether or not the user of the user device 120 and a user of another user device are connected on the SNS. For example, if feedback in response to a post is input by a user of another user device who is a SNS friend of the user of the user device 120, the effect providing unit 230 may give a higher weight to a feedback effect than that for a user who is not a SNS friend of the user of the user device 120.

The effect providing unit 230 may be configured determine whether feedback is positive or negative to a post based on a type of feedback and text included in a comment; and may be further configured to provide varying feedback effects based on a result of such determination.

Figure 3:
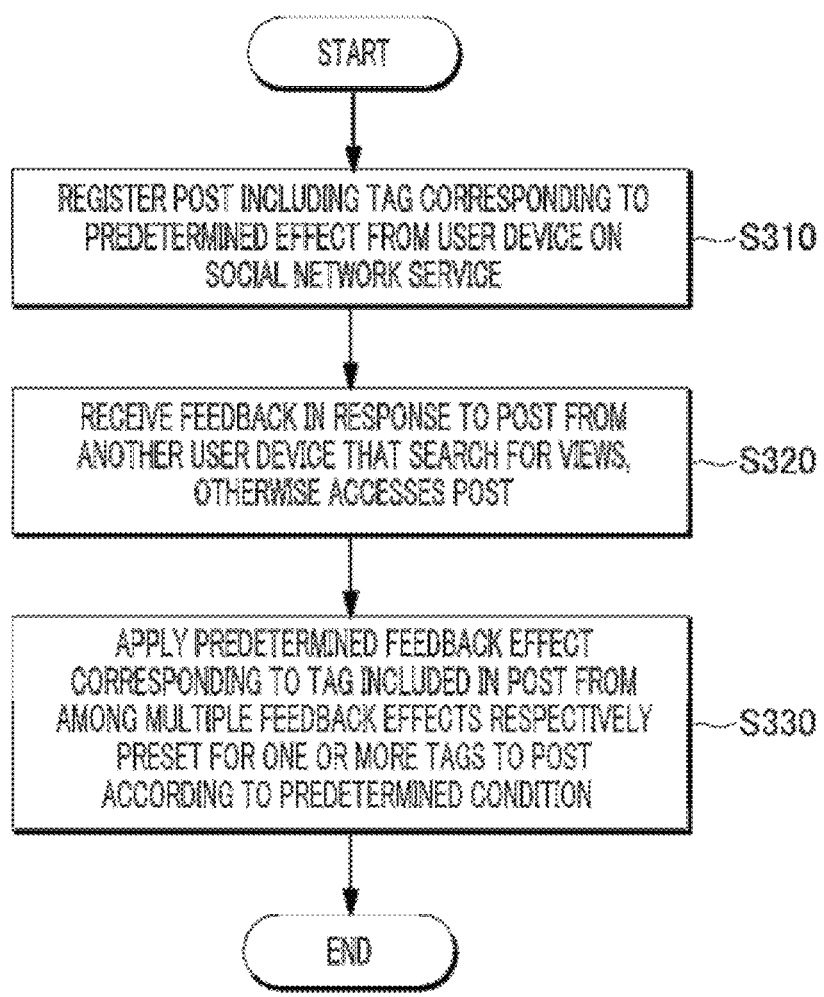
FIG. 3 shows a processing flow for providing a feedback effect service by a server, in accordance with various embodiments described herein.

FIG. 3 shows a processing flow for providing a feedback effect service by a server, in accordance with an embodiment of the present disclosure.

A method of providing a feedback effect service by the server 110 according to the embodiment illustrated in FIG. 3 includes processes performed by the server 110 according to the embodiment illustrated in FIG. 1 and FIG. 2. Therefore, descriptions of the processes performed by the server 110 may be applied to the method of providing a feedback effect service by the server 110 according to the embodiment illustrated in FIG. 1 and FIG. 2, even though they are omitted hereafter.

In S310, the server 110 may receive a post that includes a tag corresponding to a predetermined effect, from a user device, and then registers the post on a social network service (SNS).

In S320, the server 110 may receive feedback in response to the post from another user device that searches for, views, or otherwise accesses the post.

In S330, the server 110 may apply a predetermined feedback effect corresponding to the tag included in or otherwise associated with the post from among multiple feedback effects respectively preset for one or more tags according to predetermined condition.

In the descriptions above, the processes S310 to S330 may be divided into additional processes or combined into fewer processes depending on an embodiment. In addition, some of the processes may be omitted, and the sequence of the processes may be changed if necessary.

Figure 4:
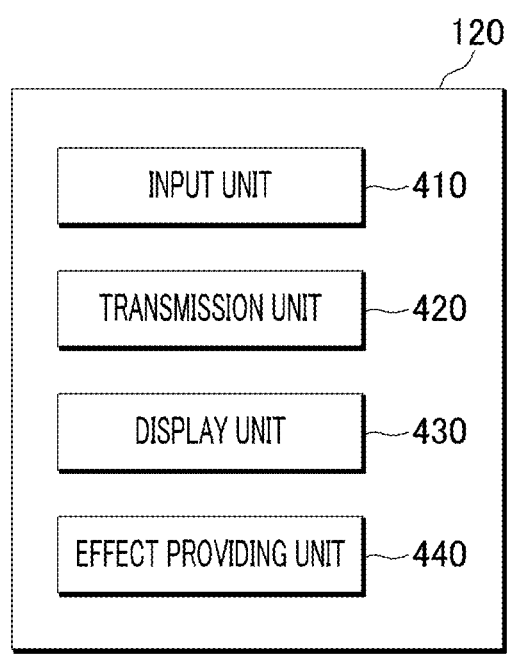
FIG. 4 shows a user device, in accordance with various embodiments described herein.

FIG. 4 shows a user device in accordance with an embodiment of the present disclosure.

As illustrated in FIG. 4, the user device 120 according to embodiments described and recited herein may include an input unit 410, a transmission unit 420, a display unit 430, and an effect providing unit 440. Hereafter, each component will be further described.

The input unit 410 may be configured to receive, from a user, a post including a tag corresponding to a predetermined effect. The input unit 410 may be further configured to receive feedback in response to the post from the posting user or other SNS users.

The transmission unit 420 may be configured to transmit the received post to the server 110. The transmission unit 420 may be further configured to transmit the received feedback to the server 110.

The display unit 430 may be configured to display a SNS post that includes a tag corresponding to a predetermined effect, in response to a user searching for, viewing, or otherwise accessing the post.

If the server 110 collects feedback in response to the post from another user device that searches for, views, or otherwise accesses the post, the effect providing unit 440 may provide a preset feedback effect that corresponds to a predetermined condition, determined by the tag.

FIG. 5 shows a processing flow for providing a feedback effect service by a feedback effect providing system, in accordance with at least one embodiment described and recited herein.

A method of providing a feedback effect which is provided by the feedback effect providing system 1 according to the embodiment illustrated in FIG. 5 includes processes performed by the server 110 and the user device 120 according to the embodiment illustrated in FIG. 1 to FIG. 4. Therefore, descriptions of the processes performed by the server 110 and the user device 120 may be applied to the feedback effect service provided by the server 110 and the user device 120 according to the embodiment illustrated in FIG. 1 to FIG. 4, even though they are omitted hereinafter.

In S510, the user device 120 may receive, from a user, a post including a tag corresponding to a predetermined effect.

In S520, the user device 120 may transmit the post to the server 110.

In S530, the server 110 may register the post on a SNS.

In S540, another user device 130 may receive feedback regarding the post.

In S550, the another user device 130 may transmit the received feedback to the server 110.

In S560, the server 110 may collect feedback in response to the post from the another user device 130.

In S570, the server 110 may apply a predetermined feedback effect corresponding to the tag included in the post or otherwise associated with the post, from among multiple feedback effects preset for one or more tags to the post according to predetermined condition.

In S580, the user device 120 or the another user device 130 may search for, view, or otherwise access the post.

In S590, the user device 120 or the another user device 130 may receive the post to which the feedback effect is applied from the server 110, and then display the post.

In the descriptions above, the processes S510 to S590 may be divided into additional processes or combined into fewer processes depending on an embodiment. In addition, some of the processes may be omitted and the sequence of the processes may be changed if necessary.

The server and the user device for providing a feedback effect service illustrated in FIG. 1 to FIG. 7C can be implemented in a computer program stored in a medium to be executed by a computer or a storage medium including instructions codes executable by a computer. Further, the server and the user device for providing a feedback service illustrated in FIG. 1 to FIG. 7C can be implemented in a computer program stored in a medium to be executed by a computer.

A computer-readable medium can be any usable medium which can be accessed by the computer and includes all volatile/non-volatile and removable/non-removable media. Further, the computer-readable medium may include all computer storage and communication media. The computer storage medium includes all volatile/non-volatile and removable/non-removable media embodied by a certain method or technology for storing information such as computer-readable instruction code, a data structure, a program module or other data. The communication medium typically includes the computer-readable instruction code, the data structure, the program module, or other data of a modulated data signal such as a carrier wave, or other transmission mechanism, and includes a certain information transmission medium.

The method and system of the present disclosure have been explained in relation to a specific embodiment, but their components or a part or all of their operations can be embodied by using a computer system having general-purpose hardware architecture.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. An apparatus that provides a feedback effect regarding a social network service (SNS) post, comprising:
    a post generation unit that receives, from a user device, a post that has a tag associated with the feedback effect, and that posts the post on the SNS;
    a feedback collection unit that collects feedback in response to the post from another user device that accesses the post; and
    an effect providing unit that applies a predetermined feedback effect corresponding to the tag included in the post according to predetermined condition,
    wherein the predetermined feedback effect is selected from among multiple feedback effects preset for one or more of tags,
    wherein the predetermined condition includes a type of the feedback and a quantity of the feedback,
    wherein the effect providing unit provides the predetermined feedback effect corresponding to the tag included in the post according to the feedback input from the another user device in response to the post,
    wherein the tag includes a hashtag, and
    wherein the type of feedback includes at least one of a comment in response to the post, text corresponding to the predetermined feedback effect as included in the comment, and emotive information.

2. The apparatus of claim 1, wherein if a quantity of text included in the comment, which corresponds to the predetermined feedback effect, exceeds a threshold value, the effect providing unit provides a secondary effect in addition to the feedback effect.

3. The apparatus of claim 1, wherein the effect providing unit determines whether the feedback is positive or negative to the post based on the type of the feedback and text included in the comment, and provides variations of the feedback effect according to the determination.

4. The apparatus of claim 1, wherein if the collected feedback is emotive information, the effect providing unit applies the feedback effect to the post to modify at least one of a quantity, contrast or saturation of colors in a background area of the post based on the collected emotive information.

5. The apparatus of claim 1, wherein if a setting value about the feedback effect is set to ON, the effect providing unit provides the feedback effect.

6. The apparatus of claim 1, wherein the post is displayed through a post user interface (UI), the post UI includes:
    a content area configured to display a content including at least one of text, an image, and a video, and
    a feedback area configured to be inputted a feedback in response to the content, and
    the feedback effect is provided over an entire area including the content area and the feedback area.

7. The apparatus of claim 6, wherein on a feed UI configured to show multiple posts provided from multiple user devices, a content area for each of the multiple posts is provided, and, thus, the feedback effect is provided within each content area.

8. The apparatus of claim 7, wherein if a post to which the feedback effect is applied is selected from the feed UI by any user device, the entire area including the content area and the feedback area is shown on a screen of the user device.

9. The apparatus of claim 1, wherein if the post includes two or more tags, the effect providing unit independently applies different feedback effects set for the respective tags to the post.

10. The apparatus of claim 1,
    wherein if the post includes a front layer, a back layer, and a post layer configured to display the post between the front layer and the back layer, the effect providing unit applies the feedback effect to the front layer or the back layer depending on a type of the tag, and
    a feedback effect applicable to the front layer is applied to overlap over at least a portion of the post and the feedback effect applicable to the back layer is applied to modify attributes of the background of the post.

11. The apparatus of claim 10, wherein if the feedback effect changes a background color of the post, the effect providing unit changes a color of the back layer.

12. The apparatus of claim 10, wherein the effect providing unit displays a predetermined object image to overlap over the post and displays the object image in at least a portion of the front layer.

13. The apparatus of claim 1, wherein the effect providing unit gives a different weight to the feedback effect depending on whether or not a user of the user device and a user of the another user device who registers the comment and the emotive information in response to the post are SNS friends.

14. A method of providing a feedback effect regarding a social network service (SNS) by a feedback effect providing apparatus, comprising:
    receiving, from a user device, a post that has a tag associated with the feedback effect and posting the post on the SNS;
    collecting feedback in response to the post from another user device that accesses the post; and applying a predetermined feedback effect corresponding to the tag included in the post according to predetermined condition, wherein the predetermined feedback effect is selected from among multiple feedback effects preset for one or more of tags, wherein the predetermined condition includes a type of feedback and the quantity of feedback, wherein the effect providing unit provides the predetermined feedback effect corresponding to the tag included in the post according to the feedback input from the another user device in response to the post, wherein the tag includes a hashtag, and wherein the type of feedback includes at least one of a comment in response to the post, text corresponding to the predetermined feedback effect as included in the comment, and emotive information.

15. A method of providing a feedback effect regarding a social network service (SNS) by a user device, comprising:

receiving a post that has a tag associated with the feedback effect; transmitting the post to a feedback effect providing apparatus;

displaying the post posted on the SNS; and providing a predetermined feedback effect corresponding to the tag included in the post according to predetermined condition if the feedback effect providing apparatus collects feedback in response to the post from another user device that accesses the post, wherein the predetermined feedback effect is selected from among multiple feedback effects preset for one or more of tags, wherein the predetermined condition includes a type of the feedback and a quantity of the feedback, wherein the effect providing unit provides the predetermined feedback effect corresponding to the tag included in the post according to the feedback input from the another user device in response to the post, wherein the tag Includes a hash tag, and wherein the type of feedback includes at least one of a comment in response to the post, text corresponding to the predetermined feedback effect as included in the comment, and emotive information.

16. A computer-readable storage medium that stores a computer program configured to execute a method of claim 15.

* * * * *